United States Patent [19]

Kardos et al.

[11] Patent Number: 5,104,562
[45] Date of Patent: Apr. 14, 1992

[54] COOLANT COMPOSITION CONTAINING POTASSIUM FORMATE AND POTASSIUM ACETATE AND METHOD OF USE

[75] Inventors: Péter Kardos; Tibor Kálmán; József Kerii; Eszter N. Kerii, all of Budapest, Hungary

[73] Assignee: Északmagyarországi Vegyimüvek, Sajóbábony, Hungary

[21] Appl. No.: 563,782

[22] Filed: Aug. 3, 1990

Related U.S. Application Data

[63] Continuation-in-part of Ser. No. 266,883, Nov. 3, 1988, abandoned.

[51] Int. Cl.$^5$ .............................................. C09K 5/00
[52] U.S. Cl. ...................................... 252/79; 252/75; 252/76; 252/77
[58] Field of Search ...................... 252/76, 79, 75, 77

[56] References Cited

U.S. PATENT DOCUMENTS

| | | | |
|---|---|---|---|
| 2,233,185 | 2/1941 | Smith | 252/76 |
| 4,219,433 | 8/1980 | Manabe et al. | 252/76 |
| 4,338,209 | 7/1982 | Manabe et al. | 252/75 |
| 4,587,028 | 5/1986 | Darden | 252/75 |

Primary Examiner—Paul Lieberman
Assistant Examiner—Christine A. Skane
Attorney, Agent, or Firm—Schweitzer Cornman & Gross

[57] ABSTRACT

A frost resistant glycol-free coolant composition or process for cooling apparatus is used for cooling, with such composition, which comprises an aqueous solution of a water soluble alkali metal salt, or a mixture of two alkali metal salts. Particularly suitable alkali metal salts are alkali metal acetate and alkali metal formate. Depending on the nature of the particular alkali metal salt or salts, and the extent of frostproofness that is required, the compositon can further contain urea and/or a glycol antifreeze, such as ethylene glycol. Optionally a corrosion inhibitor can also be used.

14 Claims, No Drawings

COOLANT COMPOSITION CONTAINING POTASSIUM FORMATE AND POTASSIUM ACETATE AND METHOD OF USE

This is a continuing application of U.S. Ser. No. 266,883, filed on Nov. 3, 1989, now abandoned.

FIELD OF THE INVENTION

The present invention relates to a cooling fluid for internal combustion engines, more particularly to a glycol free cooling fluid having increased frost resistance. The cooling fluid of the present invention is environmentally safe, therefore its use is preferred not only for the cooling of internal combustion engines, but also for operating cooling towers of thermal power stations, industrial and household refrigerators and freezers, open and closed heat exchangers, solar collectors, doublers and autoclaves used in the chemical industry, and generally providing equipment with protection against frost damage in case of freezing.

BACKGROUND OF THE INVENTION

The most generally used cooling fluid is water in the temperature range above the freezing point. In addition to its ready availability, the advantage of water is that all liquids it has the highest specific heat. it has low viscosity and, as a result of its physical properties it has good heat conductivity. In addition to these important thermal characteristics, it has a relatively moderate corrosive effect, which can be further reduced by the addition of inhibitors.

However, the disadvantage of water is that it is not frost-resistant. Upon freezing its volume increases by 9%, leading to the frost damage of equipment.

As used throughout the specification and the claims, characterizing terms such as "frost free" or "resistant to freezing" means that a material so characterized does not freeze at least substantially below the freezing point of water. Also as used throughout the specification and claims, terms such as "coolant" and "cooling fluid" are used interchangeably with the same meaning.

The frost resistance of water can be significantly improved by the addition of electrolytes that stay dissolved even at low temperatures. This possibility is, however, very much limited by the fact that the use of acids and bases is not permissible in many places for industrial safety, environmental protection and due to their corrosive nature. From a cryoscopic aspect calcium chloride has been proved to be most advantageous, because by its addition a temperature of even about 50° C. can be attained, while the solution maintains its liquid state, and only a slight increase in viscosity and a slight reduction in specific heat takes place. A much more serious problem, however, is the corrosion activating effect of the chloride ions, mainly in concentrated solutions. This effect which causes mostly a perforation corrosion, cannot be satisfactorily reduced even by the use of any known corrosion inhibitors. Solubility problems arise if other anions are used instead of chloride. When e.g. calcium sulfate is used, these problems can involve a low saturation concentration under all conditions, or when, for example, sodium sulfate or potassium nitrate is used, a dramatic decrease of saturation concentration will occur with decreasing temperature.

Hydrocarbons, alcohols, and ketones of a low carbon atom number are very advantageous with respect to frost resistance, however, the low specific heat, high volatility, i.e. low boiling point as well as the risk of fire and explosion all counsel against their use; all the more so, because certain members of this group of organic compounds, such as methanol are also poisonous, toxic and are therefore, unsafe to use in an industrial environment.

Due to their various advantages, the aqueous ethylene glycol solutions marketed as heat transfer liquids under various trade names have been accepted in a wide range as frost resistant coolants. The advantage of these solutions is that glycol can be mixed with water without limitations, fire and explosion risk is moderate, the specific heat is about twice as high as that of the aforementioned organic solvents, they are colorless, odorless and relatively frost resistant. Specific heat and solidification point are functions of the glycol-water ratio. With the increase of water content the specific heat increases, but frost resistance decreases. The lowest solidification point ($-57°$ C.) is associated with the eutectic composition. In this case the glycol content is 60% by volume. A further advantage is that in the practically important compositions the glycol-water mixture does not freeze with a concomitant increase in volume. Consequently apparatus cooled with a glycol-water coolant will not be freezing.

There are also disadvantages which limit the wider use of glycol based coolants. Ethylene glycol is very toxic and it can be easily confused with ethyl alcohol. The ingestion of ethylene glycol has led repeatedly to well publicized, occasionally fatal poisoning cases. Ethylene glycol can also contaminate the environment, and grave consequences as a result if it gets into bodies of water, such as when the coolant is carelessly discarded or when it leaks from defective equipment. The frost resistance of ethylene glycol can be only partially utilized because for example an aqueous mixture of 1:1 volume ratio has a freezing point of $-38°$ C., but at $-31°$ C. it already shows a jelly-like nonthixotropic consistence, and is thus unsuitable for pumping. The so called fluidity limit of $-31°$ C. cannot be further reduced even by modifying the glycol: water ratio, and this also means that below $-30°$ C. in complications, such as heat transfer processes were low viscosity is required the glycol-water mixture cannot be employed. The frost resistance and fluidity decrease, and the corrosiveness of aqueous ethylene glycol increases in time, due to slow polymerization and acidic decomposition of the glycol. Therefore, the mixture has to be replaced from time to time, and this increases operating expenses.

DISCLOSURE OF THE INVENTION

The invention is aimed at maintaining the advantages of glycol based aqueous coolants, and eliminating their disadvantages, and ensuring an optional arbitrary mixing ratio of the new coolant with conventional glycol-based coolant media. Consequently with conventional ethylene glycol coolant was imposed as a requirement, because we had to consider the possibility of mixing the occurrence of mistaken or mixing due to stock management requirements.

We have found that in an aqueous medium alkali metal salts of certain anions, suitably acetates and formates in combination with each other optionally with additional water soluble organic compounds, such as formamide and/or urea containing an intensively hydrophilic substituent with or without an added glycol, result in such an extreme reduction in freezing point, which is not even approached when the individual components, are separately dissolved in water.

In fact, the resultant freezing point decrease, calculated on the basis of additivity in freezing point reductions as determined separately for each component, lags far behind the freezing point reduction actually achieved by the mixture of the above mentioned components. This very significant extra effect is convincingly proven for example, with potassium acetate and potassium formate. In a concentrated aqueous solution of potassium acetate the achievable freezing point that is −38° C. (−36.4° F.) and in the case of potassium formate the solution freezes at −35° C. (−31° F.). This means that compared to the freezing point of water, the decrease of the freezing point is the same. On the other hand if these two potassium compounds are "dissolved" in water in combination with each other, employing the compositions to be described later, a composition is obtained that is liquid at 70° C., or even at lower temperatures. Nevertheless, such an extreme frost resistance is very rarely required in practice. Therefore, and also for more economical operation it is advisable to dilute the liquid with water to the extent that the resulting solution should remain frost resistant under the given climatic conditions with full safety. This approach is also justified by the fact that in all cases the specific heat and fluidity of the liquid increase on dilution.

In connection with the liquids of the present invention, including the aforementioned acetate and formate mixtures, the use of expressions such as "dissolving" and "solution" may not necessarily be theoretically accurate, because the structures of the liquids are more similar to molten matter than to aqueous solutions. Therefore, such materials which cannot be truly characterized as an aqueous "solution" are also referred to herein as an aqueous "preparation".

Since the added compounds appear completely to destroy the original liquid structure of water, the physical-chemical laws which otherwise determine the freezing point of an aqueous solution. For example, the law of molecular freezing point depression, is no longer even approximately valid. Principally, those non-water components become overwhelming, the molar freezing point depressions of which exceed that of water. On the other hand, the competitive hydrolysis of alkalimetal salts, such as of formate and acetate ions prevents the development of a long-range order characteristic for a solid crystalline phase. This can occur to such an extent that it leads to extremely low freezing points significantly deviating from those expected on the basis of additivity and interpolation calculations. This is demonstrated by numerical data.

Our other recognition was that the specific charge of alkali metal cations plays a significant role in depressing freezing point. For example, if sodium cation is used instead of potassium in the acetate-formate salt combination, the low freezing point provided by potassium cation cannot even be approached. Without intending to be bound, we believe that the reason for this is that the sodium cation has a higher specific charge, i.e. lower mass, establishes a greater field strength in its own environment, thus the water dipoles are oriented more effectively, resulting in a more limited heat motion. All this leads to a smaller decrease of freezing point, even at identical molar concentrations. Therefore, if the composition is intended to be established with sodium cations, their freezing point raising effect is to be compensated by organic compounds containing the optional hydrophilic substituents and/or by ethylene glycol.

In this case the advantage of not using glycol at all is lost, and only the advance of reduced glycol content can be realized. This means that in the case of the following Example 1, 80% less glycol is necessary for achieving an identical drop in freezing point calculated for the same volume of the liquid, than for the conventional, purely glycol-based compositions.

According to none embodiment of the invention this 80% glycol portion can now be replaced with environmentally friendly materials. If, however, the acetate salt-formate salt mixture is a salt each of the potassium cation, the glycol can be fully eliminated. If desired, it can be replaced with compounds which are harmless to the environment and would not be hazardous to health. Frost resistance and fluidity are also increased in comparison to the glycol-based cooling fluid of identical water content, as shown by the following Example 2.

Those potassium acetate, potassium formate combinations are particularly advantageous for decreasing the freezing point, wherein the mass ratio of the two anions is adjusted that the quantity (mass) of acetate in the fluid should be suitably approximately six times of that of the formate. By increasing the relative concentration of the more expensive and due to corrosive characteristics also more disadvantageous formate ions, the freezing point depression already achieved cannot be practically improved, but if a more moderate frost resistance is also sufficient in a geographic area of specified climate, then the concentration of the formate additive can be arbitrarily reduced, sometimes even entirely omitted.

On the other hand, it should be taken into consideration that in the cooling systems of internal combustion engines, the liquid can bring about simultaneous corrosion of various structural materials in metallic contact with each other. This is the possibility of coupled metal corrosion, also called contact corrosion, which can multiply the severity of corrosion. Therefore, the protection of the cooling system could be further insured by the addition of corrosion inhibitors. Although development of a new inhibitor composition was not the subject of this invention, some corrosion inhibitors known for other uses are listed below, which, as we found, provide appropriate protection.

It is an object of this invention to provide a frost resistant aqueous coolant composition containing alkalimetal, suitably potassium acetate and potassium formate as main components, significantly shifting the acetate-formate ratio to the advantage of acetate, or optionally, in the case of a moderate frost resistance requirement, entirely omitting the formate additive, while in the case where a higher frost resistance demanded the formate concentration can reach 25% of the acetate concentration. In the case of extremely high frost resistance requirement, the water content in the mixture can be reduced to 30% by mass in the mixture, while in the case of a more moderate frost resistance requirement, the water content can be increased such as by the dilution of concentrate.

It can be mentioned as guidance that in the case of a 1:6 formate-acetate anion concentration ratio which is generally considered to be optimum, by increasing the water content to 65%, the freezing point is −25° C. and with the above mentioned 30% by mass water content the freezing point is below −80° C.

It is difficult to determine and specify a classically understood freezing point in solution according to the present invention, because the liquid is rather viscous in this concentration range, and it changes gradually to a state resembling a glass-type consistency. Therefore, no well defined freezing point can be determined experimentally at that concentration. Thus as used herein, "freezing point" refers rather to the temperature at which with decreasing temperature ice crystals will first start to appear, and "solidification point" refers to the point where the liquid phase disappears.

A further object of this invention is to provide a composition which is suitable for use at more moderate frost resistance requirements, wherein sodium cations are used instead of potassium cations, In this case the use of other freezing point depressing components is such as of urea, also becomes necessary. In this embodiment of the invention ethylene glycol may also be used. By the use of this liquid the disadvantages of using glycol are only partly eliminated. A frost resistance of about $-30°$ C. can be achieved with the liquid if the concentrations of the acetate and formate anions are nearly the same and the mass concentration of urea and optionally of glycol approach of reach that of the formate and acetate ions.

A particularly advantageous coolant composition in accordance with the present invention comprises from about 3 to about 9 parts by weight water, from about 1 to about 2 parts by weight potassium formate, from about 1 to about 9 parts by weight potassium acetate, from 0 to about 1.5 parts by weight urea, and from 0 to about 1.5 parts by weight of a glycol.

Both coolant varieties can optionally be mixed in any ratio with a glycol based coolant, with the result that the well known disadvantages of glycol are proportionate to the increasing glycol content of the mixture.

Fluid compositions according to the invention can be produced in several varieties on the basis of the principles and data described above. Nevertheless, the following illustrative examples set forth some specific compositions and properties of the coolant liquids of the present invention.

EXAMPLE 1

Frost Resistant Coolant with Reduced Glycol Content 42.6 parts by weight of water, 14.9 parts by weight of sodium hydroxide, 10.6 parts by weight of urea, 11.0 parts by weight of glycol, 10.9 parts by weight of 98% formic acid and 10.9 parts by weight of 99.5% acetic acid have been mixed, and to this mixture 5 g of Na benzoate and 1 g of benzotriazole inhibitor has been added per liter of coolant. The characteristics of the resulting coolant are pH: 7.2, density at $20°$ C.: 1.210 g/cm$^3$, boiling point: $111°$ C., viscosity at $20°$ C.: 5.9 cSt, at $99°$ C.: 1.2 cSt, specific heat at $25°$ C.: 3.9 J/$°$C.cm$^3$ or 3.2 J/$°$C.g. The solidification point of the coolant is at $-35°$ C., with starting turbidity at $-28°$ C. The fluid freezes without expansion.

EXAMPLE 2

Glycol Free Environmentally Friendly Frost Resistant Coolant 407 g of potassium hydroxide, 56.2 ml of 98% formic acid, 353.4 ml of 99.5% acetic acid and 807 ml of water have been mixed to form a premix, and the inhibitor additive described in Example 1 was added to the premix. The resulting liquid had the following characteristics: pH 9.3, freezing point $-45°$ C., boiling point $110°$ C., viscosity at $22°$ C.; 2.3 cSt., density at $20°$ C.: 1.19 g/cm$^3$, specific heat in the $20°$ to $25°$ C. range: 3.27 J/$°$C.cm$^3$ or 2.75 J/$°$C.g. The liquid freezes without expansion.

EXAMPLE 3

Frost Resistant Liquid Mixtures Having Differing Glycol Content

Conventional glycol-based and the glycol-free frost resistant liquids are mixed and are used in such combination. It was experimentally determined that the two liquids can be mixed in any desired ratio, and the properties of the liquids produced in this way were also determined as a function of mixing proportion.

It was determined as a function of mixing proportion.

It was determined that the characteristics change monotonously although not linearly with the composition. These conditions are reflected by the freezing point data of the various mixtures of glycol-based cooling liquid with the trade name "Prevent" (in which the glycol content is nearly 50% by volume) and the liquid specified in Example 2, according to the following table.

Fluid according to

| Example 2 % by volume | Prevent % by volume | Freezing point °C. |
|---|---|---|
| 100 | 0 | −45 |
| 75 | 25 | −43 |
| 50 | 50 | −42 |
| 25 | 75 | −35 |
| 0 | 100 | −33 |

It can be seen that even if interpolation is not possible, the characteristics assume intermediate values which change monotonously with the ratio of the two components. The viscosity values change in a similar manner. The viscosity of the liquid of Example 2 is lower at all temperatures than that of the glycol-based frost resistant liquid and it can be pumped even at a temperature below $-30°$ C., i.e. it is fluid throughout above its freezing point. It is also important that at any composition the liquid mixture freezes without expansion.

Any variety of the liquid compositions according to the invention, such as of the Examples, can also be produced from the formate and acetate salts as starting materials prepared separately by mixing the appropriate acid and base, or can be obtained from commercial sources. The process according to the examples is considered to be more advantageous because generally the acids and bases are available as the more easily accessible basic materials.

Consequently, the advantages of coolants of the present invention, as demonstrated quantitatively in the examples, is that the disadvantages resulting from the use of glycol in the conventional glycol water coolant can be partly eliminated in certain embodiments of the coolant compositions of the invention and fully in others, without impairing the advantages of the conventional coolants. In fact in employing the glycol-free embodiments of the invention, frost resistance and fluidity improve significantly when compared with the conventional coolants, and thereby the temperature range usefulness of the coolant is significantly broadened.

A further advantage was achieved by the glycol-free embodiments of the coolants of the present invention, because the components that are employed cannot polymerize or be subjected to acidic decomposition. The coolants of the present invention can be need much larger than conventional coolants, increasing industrial safety, and decreasing costs.

Comparative freezing point experiments were conducted in which a salt:water molar ratio of 1:4.72 was employed throughout. The acetate and formate of potassium were employed, as indicated.

| Molar ratio within salt | |
|---|---|
| Acetate to Formate | Freezing point °C. |
| all:none | −38 |
| none:all | −35 |
| 6:1 | −70 |
| 9:1 | −57 |
| 1:2 | −48 |
| 5:1 | −63 |

We claim:

1. A coolant composition, comprising from about 3 to about 9 parts by weight water, from about 1 to about 2 parts by weight of potassium formate, from about 1 to about 9 parts by weight of potassium acetate, from 0 to about 1.5 parts by weight urea, and from 0 to about 1.5 parts by weight of a glycol.

2. The coolant composition of claim 1, comprising at least about 0.5 parts by weight urea.

3. The coolant composition of claim 1, comprising from about 4 to about 7 parts by weight potassium acetate and from about 1 to about 1.5 parts by weight potassium formate.

4. The coolant composition of claim 1, further comprising from about 0.1 to about 1.0 percent by mass of a corrosion inhibitor.

5. The coolant composition of claim 4, wherein said corrosion inhibitor is one or more of benzoic acid, sodium benzoate, potassium benzoate, and benzotriazole.

6. The coolant composition of claim 1, comprising from about 4 to about 6 times as much of the potassium acetate than the potassium formate.

7. The coolant composition of claim 6, which comprises at least about 30 percent by mass of water.

8. A process for cooling apparatus in need of cooling with a liquid coolant, which comprises disposing within a space in the apparatus adapted to contain a liquid coolant, a coolant which is an aqueous solution of about 1 to about 2 parts by weight of potassium formate, and potassium acetate.

9. The process of claim 8, wherein the coolant further comprises a water soluble organic compound.

10. The process of claim 9, wherein said water soluble organic compound is one or more of a formamide and urea that contains an intensively hydrophilic substituent.

11. The process of claim 10, the coolant further comprising a glycol coolant ingredient.

12. The process of claim 11, wherein said glycol coolant ingredient is ethylene glycol.

13. The process of claim 8, the and said coolant further comprising a corrosion inhibitor.

14. The process of claim 8, wherein the water content of the coolant is adjusted according to the frost resistance desired.

* * * * *